United States Patent [19]

Jacobsen

[11] 4,134,022
[45] Jan. 9, 1979

[54] FREQUENCY SENSITIVE LEVEL DETECTING APPARATUS

[75] Inventor: William F. Jacobsen, Toronto, Canada

[73] Assignee: Honeywell Inc., Minneapolis, Minn.

[21] Appl. No.: 827,493

[22] Filed: Aug. 25, 1977

[30] Foreign Application Priority Data

Sep. 3, 1976 [CA] Canada ................................. 260594

[51] Int. Cl.² ............................................ G01F 23/00
[52] U.S. Cl. ..................................... 250/577; 73/293;
  137/386; 340/619
[58] Field of Search ............ 250/357, 577, 552, 211 J;
  356/135, 136; 73/290 R, 293, 304 R; 331/65;
  137/386, 392, 558; 340/612, 617–621

[56] References Cited

U.S. PATENT DOCUMENTS

| 2,664,556 | 12/1953 | Sontheimer | 340/207 |
|---|---|---|---|
| 3,384,885 | 5/1968 | Forbush | 250/577 X |
| 3,485,262 | 12/1969 | Perren | 250/577 X |
| 3,740,563 | 6/1973 | Reichard | 250/222 R |
| 3,882,319 | 5/1975 | Clement et al. | 250/577 |
| 3,882,887 | 5/1975 | Rekai | 137/386 |
| 3,908,129 | 9/1975 | Akers | 250/577 |
| 3,908,441 | 9/1975 | Virloget | 73/55 |

Primary Examiner—Siegfried H. Grimm
Attorney, Agent, or Firm—Trevor B. Joike

[57] ABSTRACT

A level sensing apparatus is disclosed having a source for supplying a signal having a predetermined frequency, a level sensor connected to the source and having an output for supplying an output signal having the predetermined frequency as long as the material, the level of which is being sensed, is not at a predetermined level, a frequency sensitive circuit for receiving the output signal from the level sensor and for providing an output whenever the frequency of the signal is above or below the predetermined frequency, and a load which is connected to be responsive to the output from the frequency sensitive circuit.

22 Claims, 3 Drawing Figures

FREQUENCY SENSITIVE LEVEL DETECTING APPARATUS

BACKGROUND OF THE INVENTION

The present invention relates to sensing the level of a material and is particularly useful in sensing a level of liquids.

Although the invention is useful in sensing the levels of materials such as liquids in any type of application, the monitoring of the filling of flammable fluids into tank trucks is used herein for purposes of explanation. When tank trucks used for hauling such fluids are filled, it is advantageous from a safety standpoint as well as from a control standpoint to sense the level of the liquid. Overfilling of such a vehicle involves not only waste but a danger of explosion resulting from sparks, static electricity or other forms of ignition. It would, of course, be possible for the operator of the filling pumps to make a visual survey of the liquid level of the tank. However, flammable liquid handling vehicles are often compartmentalized making visual observation of a plurality of tanks impossible or at least very difficult. Also, there may not be the necessary personnel in attendance to supervise the filling operation.

It thus becomes apparent that some form of automatic liquid level control or detection is necessary to supervise the filling operation. The system must also be reliable in view of the grave consequences which could result from a failure of the supervisory system.

Level sensing systems are known in the prior art and involve a number of different types of sensors for monitoring the level of the material or liquid. These types include capacitive sensors, optical sensors, electrical contacts and switches responsive to the level of the material or liquid. As these systems developed, it became apparent that these systems could fail in a mode which would prevent or inhibit a proper responsive by the indicating or control apparatus controlled by the sensor. For example, one such prior art system involves transmitting light from a source through fiber optics to a prism which reflects that light through a second fiber optic element to a photosensitive device as long as the liquid is below the prism. As long as the photosensitive device is receiving light, it operates under the assumption that the liquid is below the prism and will, therefore, maintain the indicator off or the valve which is controlling the filling operation open. Should a break in the second fiber optic element occur, but in a way which allows this broken element to pick up light from another source such as the sun, the photosensitive device will still receive light which will maintain the indicator off or the valve open even though the liquid is above the predetermined level. Thus, the liquid filling will continue and overflow the tank.

The prior art solution to this type of failure mode was to use a pulsating light source and a circuit responsive to the cessation of pulses for providing the proper indication or closing of the valve. In this manner, when the liquid reached the prism, the index of refraction at the prism surface changed and the pulsating light, instead of being reflected by the prismatic surfaces, passed into the liquid. Since the pulses terminated, the indication was given or the valve was closed. If a fiber optic broke and picked up light from another source or if any electronic element in the system failed providing for a continuous signal, again the pulses ceased and the proper indication or closure of the valve was given.

These prior art devices, however, failed to distinguish between the signal pulses of the system and pulses introduced into the system by noise sources such as fluorescent lights, power lines or strong ambient light. These sources of noise can impose signals in the system which are pulsating in nature and which will exist even after the material being sensed has reached the sensor to stop the transmission of the primary sensing signal from the signal source. Thus, the system is made to believe that the material has not reached the sensor and the filling operation will continue overflowing the container.

SUMMARY OF THE INVENTION

The present invention not only responds to the cessation of pulses in the system but also to frequencies other than the signal frequency of the system. The invention includes a source for supplying a system signal having a predetermined frequency as long as the material, the level of which is being sensed, is not at a predetermined level, a frequency sensitive circuit which is connected to receive the transmitted signal and which provides an output if the frequency of the signal changes and a load which is responsive to the output from the frequency sensitive circuit.

In this manner, the circuit will respond to signal frequencies above or below the predetermined frequency to provide the proper output. Thus, when liquid or the material sensed reaches the predetermined level, the pulses will terminate thus lowering the signal frequency and the circuit provides the proper output. If noise is generated in the system from an external source, the system will respond to the frequency to also provide the proper output.

BRIEF DESCRIPTION OF THE DRAWINGS

These and other features and advantages will become more apparent from a detail consideration of the invention taken in conjunction with the drawings in which.

DETAILED DESCRIPTION

Figure 1:
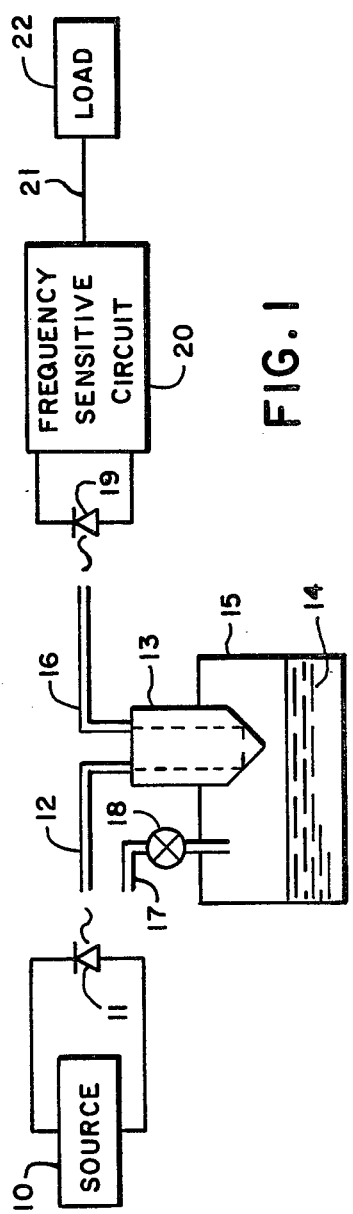
FIG. 1 shows a block diagram of the sensing apparatus used for one tank.

In FIG. 1, source 10 generates electrical pulses, for example pulses of 1.0 millisecond duration at a frequency of 25 Hertz, to light emitting diode 11. The light emitting diode 11 will generate pulses of light having the same duration and frequency as the electrical pulses supplied by source 10. The pulses of light are transmitted by fiber optic element 12 to a prismatic device 13. Device 13 is located to sense the level of liquid 14 within a tank 15 and may be positioned at any distance into the tank to establish any predetermined level for liquid 14. As long as the level of the liquid within tank 15 is below the prismatic device 13, the light is reflected, shown by the dashed line, to a fiber optic element 16. Tank 15 is filled with fluid 14 through line 17 and valve 18.

The light transmitted by fiber optic element 16 is supplied to a photosensitive diode 19 which is connected to a frequency sensitive circuit 20. Frequency sensitive circuit 20 will provide an output on line 21 if the light impinging upon photo responsive diode 19 or the consequent electrical signal within circuit 20 is of a frequency other than the frequency of the signal supplied by source 10. This output can be used to deenergize valve 18 or provide an indication by way of a light or a sound mechanism which are generally shown as a load 22.

The light is transmitted by the prism from element 12 to element 16 as long as the liquid remains below the prism. When the level of the liquid 14 reaches the prism, and particularly the reflecting surfaces of the prism 13, the index of a refraction at these reflecting surfaces will change and the light issuing from element 12 will pass through the surface of the prism 13 into the liquid and will not be reflected to the element 16. Thus, the frequency of the signal essentially drops to zero which is detected by frequency sensitive circuit 20 to provide an output on line 21. This output can be either the supply of a signal to load 22 or the termination of a signal to load 22.

Figure 2:
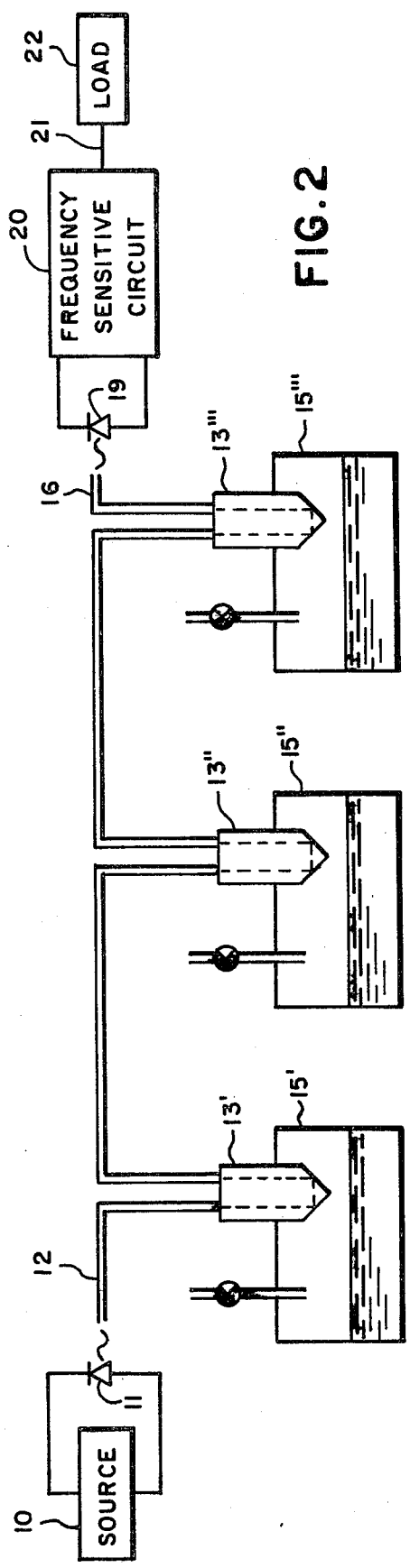
FIG. 2 shows a block diagram of the sensing apparatus used for sensing a plurality of tanks; and, FIG. 3 shows a detailed circuit arrangement of the instant invention.

FIG. 1 shows a system for monitoring the level of a liquid in one tank 15. In FIG. 2, system is shown for monitoring the level of liquid in a plurality of tanks. The light used for monitoring the level of the liquid in the tanks is generated by diode 11 and transmitted to the first prismatic device 13' by fiber optic element 12. The light is reflected by the prismatic surfaces and transmitted to the next prismatic device 13" located in the second tank 15'''. The light is reflected by the prismatic surfaces of device 13''' and supplied by fiber optic element 16 to photo responsive diode 19 and processed in the same manner as the light in the apparatus shown in FIG. 1. If the liquid in any of the tanks 15'—15''' reaches the reflecting surfaces of the corresponding prismatic device, the light flowing through the fiber optics elements from element 12 to element 16 will be interrupted and an output will be generated on line 21. Thus, an indication can be given or the filling operation of all tanks can be terminated.

Figure 3:
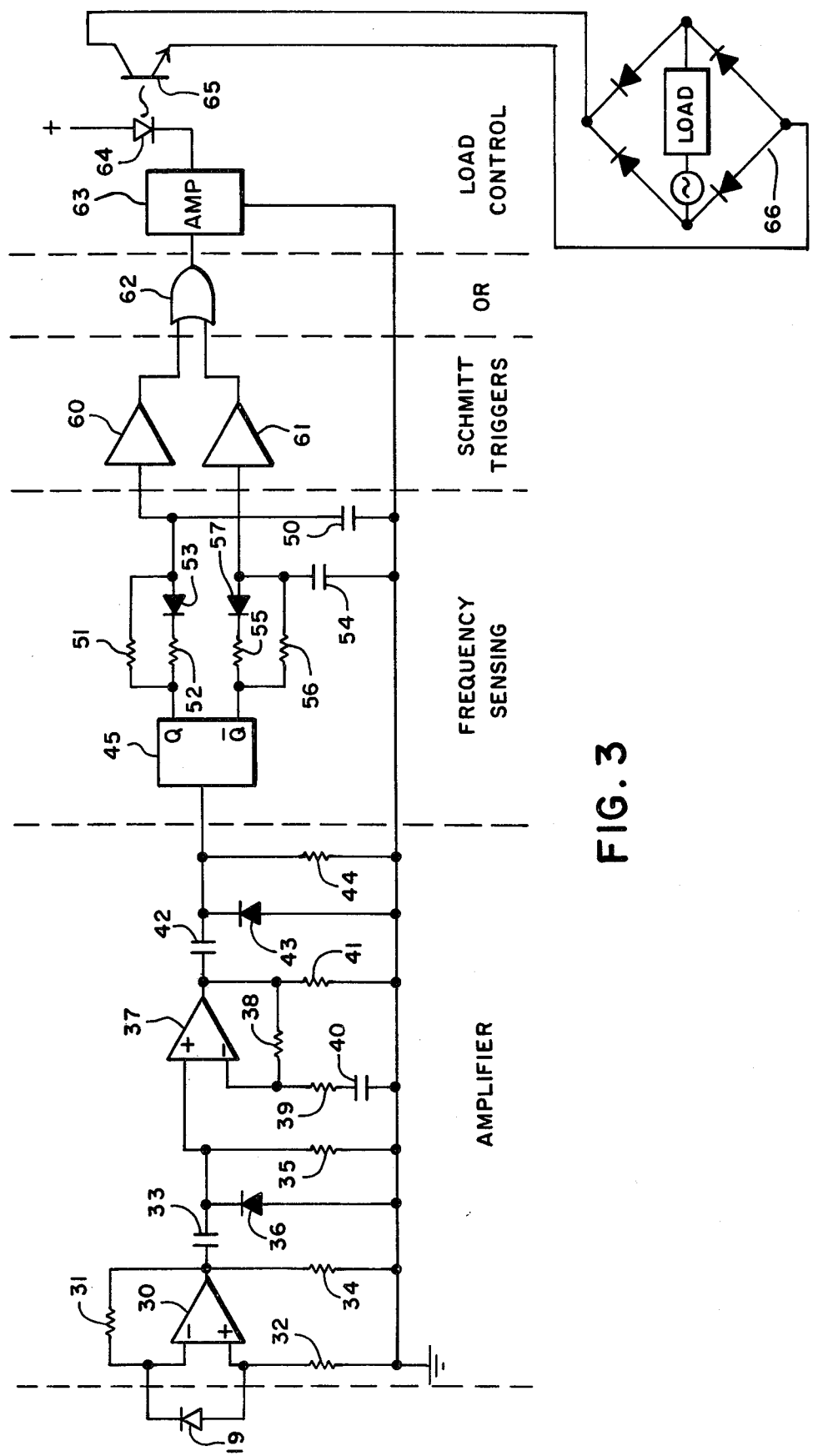

FIG. 3 shows the frequency sensitive circuit in more detail. The light impinging upon photo responsive diode 19 is converted thereby to an electrical signal which is supplied to an amplifier 30 having its negative input terminal connected to one side of the photo responsive diode 19 and its positive input terminal connected to the other side of the diode 19. Resistor 31 is connected from the output of amplifier 30 to its negative input and resistor 32 is connected from the positive input of amplifier 30 to ground. The output of amplifier 30 is connected to ground through resistor 34. Assuming that there is no noise on the line or that the liquid level has not reached the reflecting surfaces of the prism, the input signal to the amplifier 30 will have a pulse duration and frequency substantially corresponding to the signal supplied by the source 10. The output from amplifier 30 is AC coupled by capacitor 33 to the positive input of non-inverting amplifier 37. The junction of capacitor 33 and the positive input of amplifier 37 is connected to ground through the parallel combination of diode 36 and resistor 35. The output of amplifier 37 is connected to the negative input of the amplifier 37 through a resistor 38 and the negative input terminal is also connected to ground through a series circuit comprising resistor 39 and capacitor 40. The output of the amplifier 37 is also connected through a resistor 41 to ground. The output of amplifier 37 is AC coupled through capacitor 42 to the input of a monostable multivibrator 45. The junction of capacitor 42 and the input to multivibrator 45 is connected to ground through the parallel combination of diode 43 and resistor 44.

Again, if there is no noise generating false signals in the system or if liquid has not impinged upon the reflecting surfaces of the prisms, the signal supplied to the input of monostable multivibrator 45 will have a pulse duration and frequency corresponding to the signal supplied by the source 10. The monostable multivibrator 45 has the type number CM4047 manufactured by Solitron. The Q output from monostable multivibrator 45 is preferably a square wave pulse of, for example, 20 millisecond duration every 40 milliseconds. The result is a symmetrical square wave. The $\overline{Q}$ output is the inversion of the Q output. The Q output of multivibrator 45 is connected to capacitor 50 through series resistor 52 and diode 53 in parallel with resistor 51 and the $\overline{Q}$ output is connected to capacitor 54 through series resistor 55 and diode 57 in parallel with resistor 56. The other sides of capacitors 50 and 54 are connected to ground. The junction of capacitor 50 and diode 53 is connected to the input of Schmitt trigger 60 and the junction of capacitor 54 and diode 57 is connected to the input of Schmitt trigger 61.

If the input signal to monostable multivibrator 45 corresponds to the frequency of the source 10, the Q and $\overline{Q}$ outputs of monostable multivibrator 45 will be symmetrical square waves and the voltage developed across capacitors 50 and 54 will be insufficient to trigger either of the Schmitt triggers 60 or 61. If the input frequency to monostable multivibrators 45 deviates from the frequency supplied by source 10, resulting from a noise induced signal in the system or from liquid impinging upon the prismatic surfaces, one or the other capacitor 50 or 54 will charge to a sufficient level to fire its corresponding Schmitt trigger 60 or 61. The particular Schmitt trigger 60 or 61 which will fire depends upon whether the deviation is above or below the source frequency, in this example 25 Hertz.

The outputs of the Schmitt triggers 60 and 61 are ORed at 62 the output of which will go high whenever either of the outputs from Schmitt triggers 60 or 61 goes high. The output from OR circuit 62 is connected to an amplifier 63 which may be a device having the type number CM4010 manufactured by Solitron. The device 63 acts as a current sink which energizes the LED 64 whenever the output from OR circuit 62 goes high. Upon energization of the LED 64, photo responsive device or transistor 65 is energized to allow the supply of AC to a load 66. The load may be arranged to provide an indication or to close the valve controlling the filling operation or the level of material being sensed. It should also be noted that the photo responsive transistor 65, the AC source and the load 66 may be arranged to deenergize when the frequency sensitive circuit supplies its output.

The embodiments of the invention in which an exclusive property or right is claimed are defined as follows:

1. An apparatus for sensing the level of material comprising:
    source means for supplying a signal having a predetermined frequency;
    level sensing means having an input connected to said source means and an output for supplying a signal having said predetermined frequency as long as said material is not at a predetermined level;
    frequency sensitive means connected to said output of said level sensing means for providing an output when said signal is above said predetermined frequency and an output when said signal is below said predetermined frequency; and, load means connected to said frequency sensitive means for responding to said outputs.

2. The apparatus of claim 1 wherein said frequency sensitive means comprises means for generating first and second voltages wherein said first voltage is greater than said second voltage when said signal is above said predetermined frequency, said first and second voltages are equal when said signal is substantially at said predetermined frequency, and said first voltage is less than said second voltage when said signal is below said predetermined frequency.

3. The apparatus of claim 2 wherein said means for generating said first and second voltages comprises multivibrator means having an input connected to said output of said level sensing means, a first output connected to a first capacitor for generating said first voltage, and a second output connected to a second capacitor for generating said second voltage.

4. The apparatus of claim 3 wherein said frequency sensitive means further comprises first voltage level sensing means connected to said first capacitor for providing an output when said first voltage exceeds a predetermined level and second voltage level sensing means connected to said second capacitor for providing an output when said second voltage exceeds a predetermined level.

5. The apparatus of claim 4 wherein said first voltage level sensing means comprises a first Schmitt trigger having an input connected to said first capacitor and an output and said second voltage level sensing means comprises a second Schmitt trigger having an input connected to said second capacitor and an output.

6. The apparatus of claim 5 wherein said frequency sensitive means further comprises an OR circuit which has a first input connected to the output of said first Schmitt trigger and a second input connected to said output of said second Schmitt trigger for providing said frequency sensitive means output when said signal is above said predetermined frequency and said frequency sensitive means output when said signal is below said predetermined frequency.

7. The apparatus of claim 6 wherein said source means comprises a source of light having said predetermined frequency, and said level sensing means comprises a prism having reflecting surfaces for receiving said light and reflecting said light as long as said material is not impinging upon the reflecting surfaces of said prism and a photo responsive means responsive to said light for providing said output of said level sensing means.

8. The apparatus of claim 1 wherein said source means comprises a source of light having said predetermined frequency, and said level sensing means comprises a prism having reflecting surfaces for receiving said light and reflecting said light as long as said material is not impinging upon the reflecting surfaces of said prism and a photo responsive means responsive to said light for providing said output of said level sensing means.

9. An apparatus for sensing the level of a liquid comprising:
source means for supplying a signal having a predetermined frequency;
liquid level sensing means having an input connected to said source means and an output for supplying a signal having said predetermined frequency until said liquid attains a predetermined level;
frequency sensitive means connected to said output of said liquid level sensing means for providing an output when said signal is above said predetermined frequency and an output when said signal is below said predetermined frequency; and,
load means connected to said frequency sensitive means for responding to said output.

10. The apparatus of claim 9 wherein said frequency sensitive means comprises means for generating first and second voltages wherein said first voltage is greater than said second voltage when said signal is above said predetermined frequency, said first and second voltages are equal when said signal is substantially at said predetermined frequency, and said first voltage is less than said second voltage when said signal is below said predetermined frequency.

11. The apparatus of claim 10 wherein said means for generating said first and second voltages comprises multivibrator means having an input connected to said output of said level sensing means, a first output connected to a first capacitor for generating said first voltage, and a second output connected to a second capacitor for generating said second voltage.

12. The apparatus of claim 11 wherein said frequency sensitive means further comprises first voltage level sensing means connected to said first capacitor for providing an output when said first voltage exceeds a predetermined level and second voltage level sensing means connected to said second capacitor for providing an output when said second voltage exceeds a predetermined level.

13. The apparatus of claim 12 wherein said first voltage level sensing means comprises a first Schmitt trigger having an input connected to said first capacitor and an output and said second voltage level sensing means comprises a second Schmitt trigger having an input connected to said second capacitor and an output.

14. The apparatus of claim 13 wherein said frequency sensitive means further comprises an OR circuit which has a first input connected to the output of said first Schmitt trigger and a second input connected to said output of said second Schmitt trigger for providing said frequency sensitive means output when said signal is above said predetermined frequency and said frequency sensitive means output when said signal is below said predetermined frequency.

15. The apparatus of claim 14 wherein said source means comprises a source of light having said predetermined frequency, and said level sensing means comprises a prism having reflecting surfaces for receiving said light and reflecting said light as long as said liquid is no impinging upon the reflecting surfaces of said prism and a photo responsive means responsive to said light for providing said output of said liquid level sensing means.

16. The apparatus of claim 9 wherein said source means comprises a source of light having said predetermined frequency, and said level sensing means comprises a prism having reflecting surfaces for receiving said light and reflecting said light as long as said liquid is not impinging upon the reflecting surfaces of said prism and a photo responsive means responsive to said light for providing said output of said liquid level sensing means.

17. An optical liquid level sensing apparatus for sensing the level of a liquid comprising:
light source means for supplying light having a predetermined frequency;

prismatic means having an input connected to said source to light for transmitting said light having said predetermined frequency to an output until said liquid obtains a predetermined level;

light responsive means connected to said output of said prismatic means for generating an electrical signal having a frequency corresponding to the frequency of said light;

frequency sensitive means connected to said light responsive means for receiving said electrical signal and for providing an output when said signal is above said predetermined frequency and an output when said signal is below said predetermined frequency; and, load means connected to said frequency sensitive means for responding to said outputs.

18. The apparatus of claim 17 wherein said frequency sensitive means comprises means for generating first and second voltages wherein said first voltage is greater than said second voltage when said signal is above said predetermined frequency, said first and second voltages are equal when said signal is substantially at said predetermined frequency, and said first voltage is less than said second voltage when said signal is below said predetermined frequency.

19. The apparatus of claim 18 wherein said means for generating said first and second voltages comprises multivibrator means having an input connected to said output of said light responsive means, a first output connected to a first capacitor for generating said first voltage, and a second output connected to a second capacitor for generating said second voltage.

20. The apparatus of claim 19 wherein said frequency sensitive means further comprises first voltage level sensing means connected to said first capacitor for providing an output when said first voltage exceeds a predetermined level and second voltage level sensing means connected to said second capacitor for providing an output when said second voltage exceeds a predetermined level.

21. The apparatus of claim 20 wherein said first voltage level sensing means comprises a first Schmitt trigger having an input connected to said first capacitor and an output and said second voltage level sensing means comprises a second Schmitt trigger having an input connected to said second capacitor and an output.

22. The apparatus of claim 21 wherein said frequency sensitive means further comprises an OR circuit which has a first input connected to the output of said first Schmitt trigger and a second input connected to said output of said second Schmitt trigger for providing said frequency sensitive means output when said signal is above said predetermined frequency and said frequency sensitive means output when said signal is below said predetermined frequency.

* * * * *

UNITED STATES PATENT OFFICE
CERTIFICATE OF CORRECTION

PATENT NO. : 4,134,022
DATED : January 9, 1979
INVENTOR(S) : William F. Jacobsen It is certified that error appears in the above-identified patent and that said Letters Patent are hereby corrected as shown below:

On cover page cancel "Honeywell Inc., Minneapolis, Minn." as Assignee and substitute --Honeywell Ltd., Scarborough, Ontario, Canada

Signed and Sealed this

Twenty-sixth Day of February 1980

[SEAL]

*Attest:*

SIDNEY A. DIAMOND

*Attesting Officer*  *Commissioner of Patents and Trademarks*